United States Patent
Kim et al.

(10) Patent No.: US 11,184,854 B2
(45) Date of Patent: Nov. 23, 2021

(54) METHOD FOR TRANSMITTING OR RECEIVING FRAME IN WIRELESS LAN AND APPARATUS THEREFOR

(71) Applicant: LG Electronics Inc., Seoul (KR)

(72) Inventors: Jeongki Kim, Seoul (KR); Suhwook Kim, Seoul (KR); Kiseon Ryu, Seoul (KR); Taewon Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/760,824

(22) PCT Filed: Nov. 1, 2018

(86) PCT No.: PCT/KR2018/013179
§ 371 (c)(1),
(2) Date: Apr. 30, 2020

(87) PCT Pub. No.: WO2019/088732
PCT Pub. Date: May 9, 2019

(65) Prior Publication Data
US 2021/0227469 A1    Jul. 22, 2021

Related U.S. Application Data

(60) Provisional application No. 62/581,011, filed on Nov. 2, 2017.

(51) Int. Cl.
*H04W 52/02* (2009.01)
*H04W 56/00* (2009.01)
*H04W 84/12* (2009.01)

(52) U.S. Cl.
CPC ..... *H04W 52/0235* (2013.01); *H04W 56/001* (2013.01); *H04W 84/12* (2013.01)

(58) Field of Classification Search
CPC ........... H04W 52/0235; H04W 56/001; H04W 84/12
See application file for complete search history.

(56) References Cited

U.S. PATENT DOCUMENTS

2018/0132176 A1* 5/2018 Abraham ............... H04L 43/087
2019/0208470 A1* 7/2019 Asterjadhi .......... H04W 52/028

FOREIGN PATENT DOCUMENTS

EP            3096467        11/2016
WO      WO2018230147        12/2018

OTHER PUBLICATIONS

Asterjadhi et al., "Considerations on WUR frame format," IEEE 802.11-17/1004r4, dated Jul. 4, 2017, 26 pages.
(Continued)

*Primary Examiner* — Kyaw Z Soe
(74) *Attorney, Agent, or Firm* — Fish & Richardson P.C.

(57) ABSTRACT

A method for an STA for receiving a WUR frame in a WLAN, according to one embodiment of the present invention, comprises the steps of: receiving a WUR frame including a first portion of a TSF timer and an MIC value; calculating an MIC verification value on the basis of the first portion of the TSF timer and the TSF timer stored in the STA; and determining whether to discard the received WUR frame depending on whether the MIC value included in the WUR frame matches the calculated MIC verification value, wherein the first portion of the TSF timer included in the WUR frame is the 8-bits following the least significant N-bit in the TSF timer, and the STA may obtain a continuous 48-bit partial TSF timer value through the first portion of the TSF timer and a second portion of the TSF timer stored in the STA, and may calculate the MIC verification value on the basis of the obtained 48-bit partial TSF timer value.

15 Claims, 28 Drawing Sheets

(56) References Cited

OTHER PUBLICATIONS

Huang et al., "Specification Framework for TGba," IEEE 802.11-17/0575r5, dated Sep. 29, 2017, 9 pages.
Liwen Chu, "Synchronization with Low Power Antenna," IEEE 802.11-17/0447r1, dated Mar. 11, 2017, 8 pages.
Mediatek Inc., "Packet Format of 11ba," IEEE 802.11-17/1340r0, dated Aug. 10, 2017, 5 pages.
MediaTek Inc., "WUR Synchronization," IEEE 802.11-17/1384r0, dated Sep. 11, 2017, 10 pages.
PCT International Search Report and Written Opinion in International Application No. PCT/KR2018/013179, dated Feb. 13, 2019, 16 pages (with English translation).
EP Extended European Search Report in European Appln. No. 18873187.1, dated May 31, 2021, 15 pages (with English translation).

\* cited by examiner (a)

(b)

(a)

(b)

(a) Option 1

(b) Option 2

(c) Option 3

Option 3

METHOD FOR TRANSMITTING OR RECEIVING FRAME IN WIRELESS LAN AND APPARATUS THEREFOR

CROSS-REFERENCE TO RELATED APPLICATIONS

This application is a National Stage application under 35 U.S.C. § 371 of International Application No. PCT/KR2018/013179, filed on Nov. 1, 2018, which claims the benefit of U.S. Provisional Application No. 62/581,011, filed on Nov. 2, 2017. The disclosures of the prior applications are incorporated by reference in their entirety.

TECHNICAL FIELD

The present disclosure relates to a wireless local area network system and, more particularly, to a method of transmitting or receiving a Wake-Up Radio (WUR) frame to wake a Primary Connectivity Radio (PCR) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DETAILED DESCRIPTION OF THE DISCLOSURE

Technical Tasks

It is a technical object of the present disclosure to provide a method of more accurately and efficiently transmitting or receiving a WUR frame and an apparatus therefor.

The present disclosure is not limited to the above technical problems and other technical objects may be inferred from embodiments of the present disclosure.

Technical Solutions

In one technical aspect of the present disclosure, provided herein is a method of receiving a Wake-Up Radio (WUR) frame by a Station (STA) in a Wireless LAN (WLAN), the method including receiving the WUR frame including a first portion of a Timing Synchronization Function (TSF) timer and a Message Integrity Check (MIC) value, calculating a MIC verification value based on the first portion of the TSF timer and the TSF timer stored in the STA, and determining whether to discard the received WUR frame based on whether the MIC value included in the WUR frame matches the calculated MIC verification value, wherein the first portion of the TSF timer included in the WUR subframe is 8 bits next to least significant N bits in the TSF timer and wherein the STA obtains a consecutive 48-bit partial TSF timer value through the first portion of the TSF timer and a second portion of the TSF timer stored in the STA and calculates the MIC verification value based on the obtained 48-bit partial TSF timer value.

In another technical aspect of the present disclosure, provided herein is a computer-readable recording medium for recording a program for executing the WUR frame method described above.

In further technical aspect of the present disclosure, provided herein is a Station (STA) receiving a Wake-Up Radio (WUR) frame, the STA including a receiver receiving the WUR frame including a first portion of a Timing Synchronization Function (TSF) timer and a Message Integrity Check (MIC) value and a processor configured to calculate a MIC verification value based on the first portion of the TSF timer and the TSF timer stored in the STA and determine whether to discard the received WUR frame based on whether the MIC value included in the WUR frame matches the calculated MIC verification value, wherein the first portion of the TSF timer included in the WUR subframe is 8 bits next to least significant N bits in the TSF timer and wherein the processor obtains a consecutive 48-bit partial TSF timer value through the first portion of the TSF timer and a second portion of the TSF timer stored in the STA and calculates the MIC verification value based on the obtained 48-bit partial TSF timer value.

The TSF timer may be total 64 bits and most significant M-bit of the TSF timer may be excluded from the partial TSF timer.

The STA may obtain the consecutive 48-bit partial TSF timer value by setting the first portion of the TSF timer to least significant 8 bits of the consecutive 48-bit partial TSF timer value and setting the second portion of the TSF timer stored in the STA to the remaining 40 bits of the consecutive 48-bit partial TSF timer value, thereby obtaining the successive 48-bit partial TSF metric timer value.

The MIC value may be included in a Frame Check Sequence (FCS) of the WUR subframe.

If the MIC value included in the WUR frame does not match the MIC verification value calculated by the STA, the STA may discard the WUR frame. If the MIC value included in the WUR frame matches the MIC verification value calculated by the STA, the STA may perform a wake-up operation based on the WUR frame.

The STA may receive a WUR beacon frame prior to receiving the WUR frame and set the TSF timer to be stored in the STA based on TSF timer information included in the WUR beacon frame.

The TSF timer information may be included in a Type Dependent (TD) control field of the WUR beacon frame.

The STA may determine that the MIC value is included in the WUR subframe only if a prescribed indicator in a MAC header of the WUR subframe is a first value.

Advantageous Effects

According to an embodiment of the present disclosure, a WUR frame is protected on the basis of a TSF synchronized between an AP, which is a normal sender of a WUR subframe, and an STA, which is a recipient, thereby improving reliability of transmitting and receiving a WUR subframe and solving a problem that an STA is unnecessarily awakened by malicious attack, channel congestion, etc.

Other technical effects besides the technical effects described above may be inferred from embodiments of the present disclosure.

BEST MODE FOR DISCLOSURE

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described before, the following description is given of a method and apparatus for increasing a spatial reuse rate in a Wireless Local Area Network (WLAN) system. To do so, a WLAN system to which the present disclosure is applied will first be described in detail.

Figure 1:
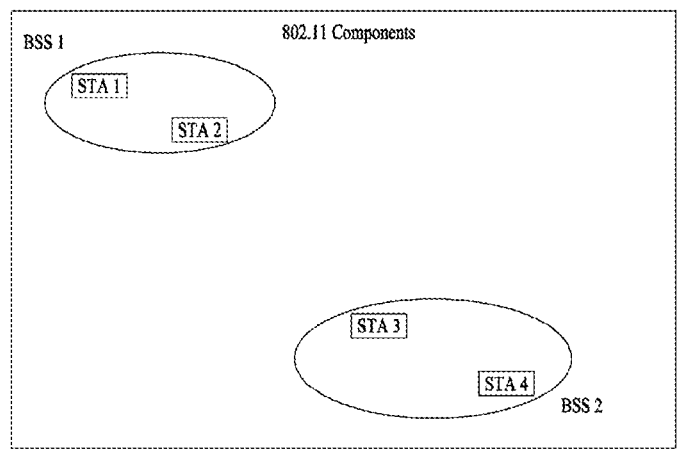
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
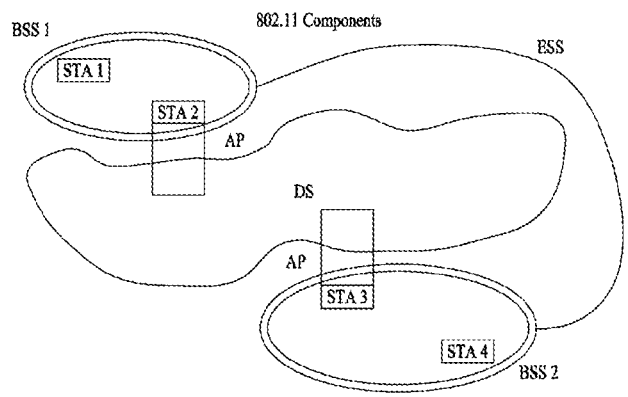
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME GET/SET primitives through an MLME Service Access Point (MLME SAP). In addition, various PLME GET/SET primitives may be exchanged between the PLME and the SME through a PLME SAP, and exchanged between the MLME and the PLME through an MLME-PLME SAP.

Link Setup Process

Figure 3:
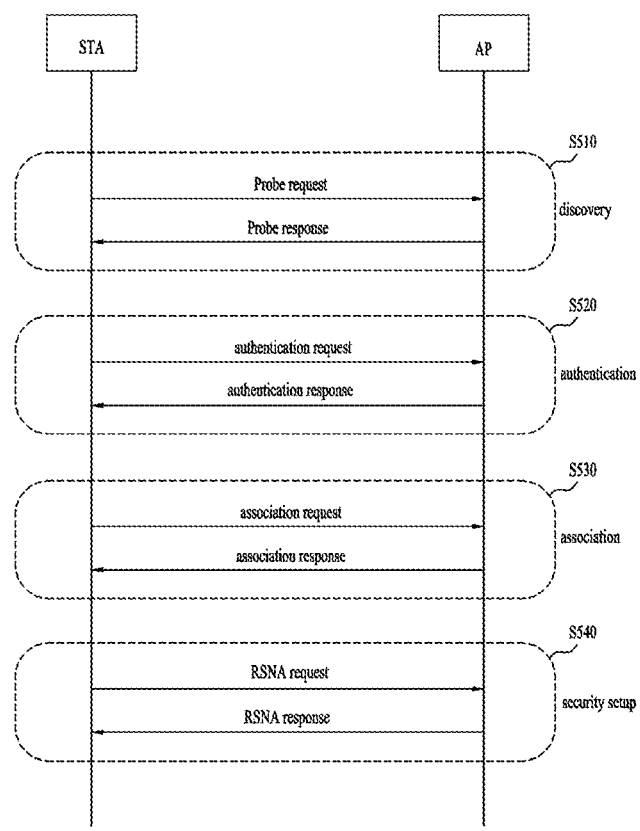
FIG. 3 illustrates a general link setup procedure.

FIG. 3 is a flowchart explaining a general link setup process according to an exemplary embodiment of the present disclosure.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/ response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
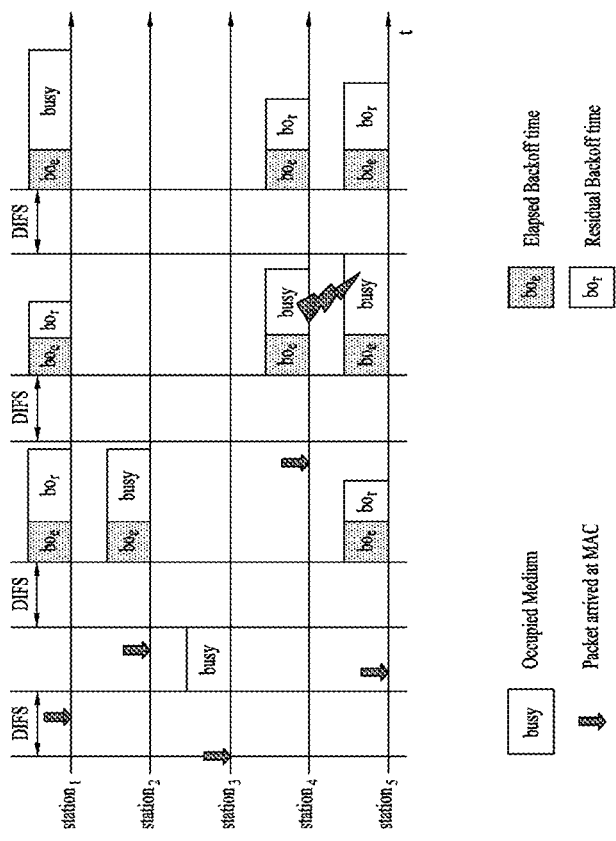
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present disclosure.

Figure 5:
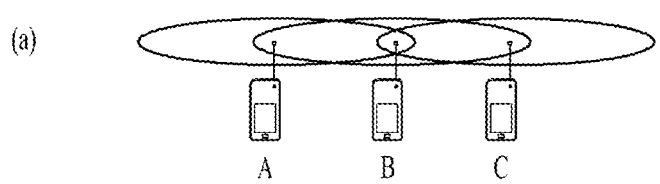
FIG. 5 is an explanatory diagram of a hidden node and an exposed node.
Figure 5:
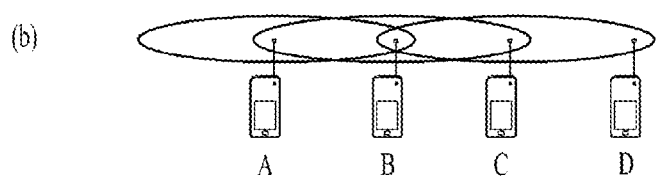

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
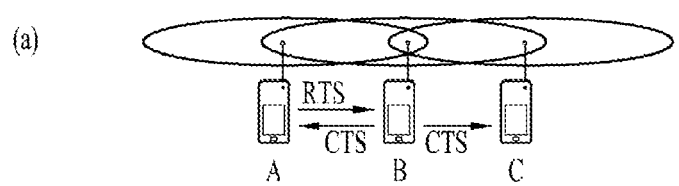
FIG. 6 is an explanatory diagram of RTS and CTS.
Figure 6:
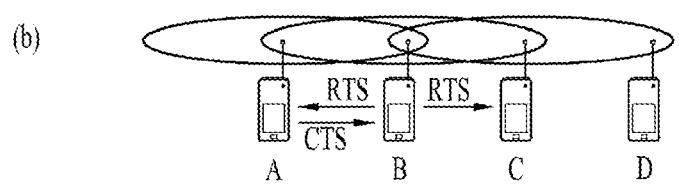

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
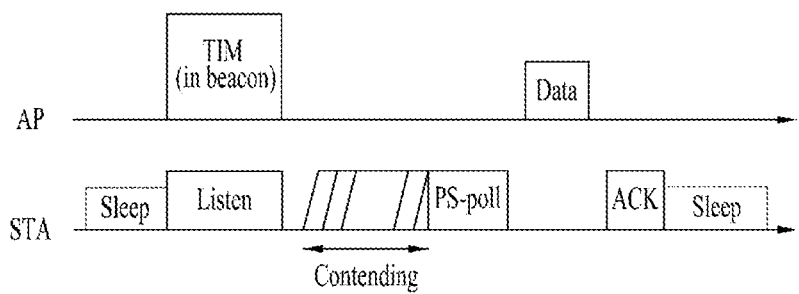
FIGS. 7 to 9 are explanatory diagrams of operation of an STA that has received TIM.
Figure 8:
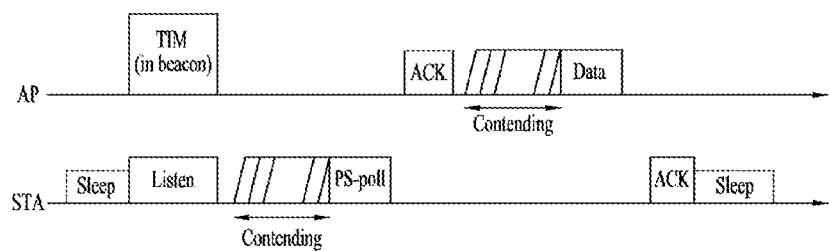
Figure 9:
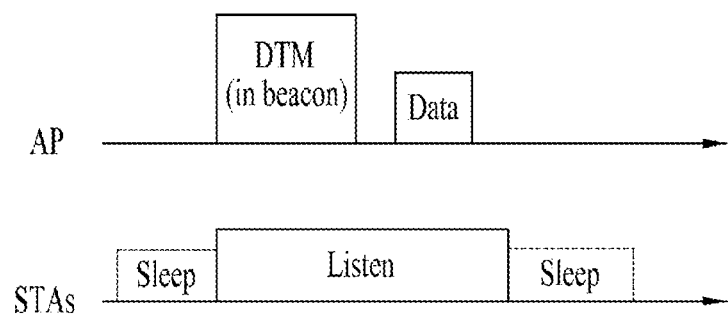

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
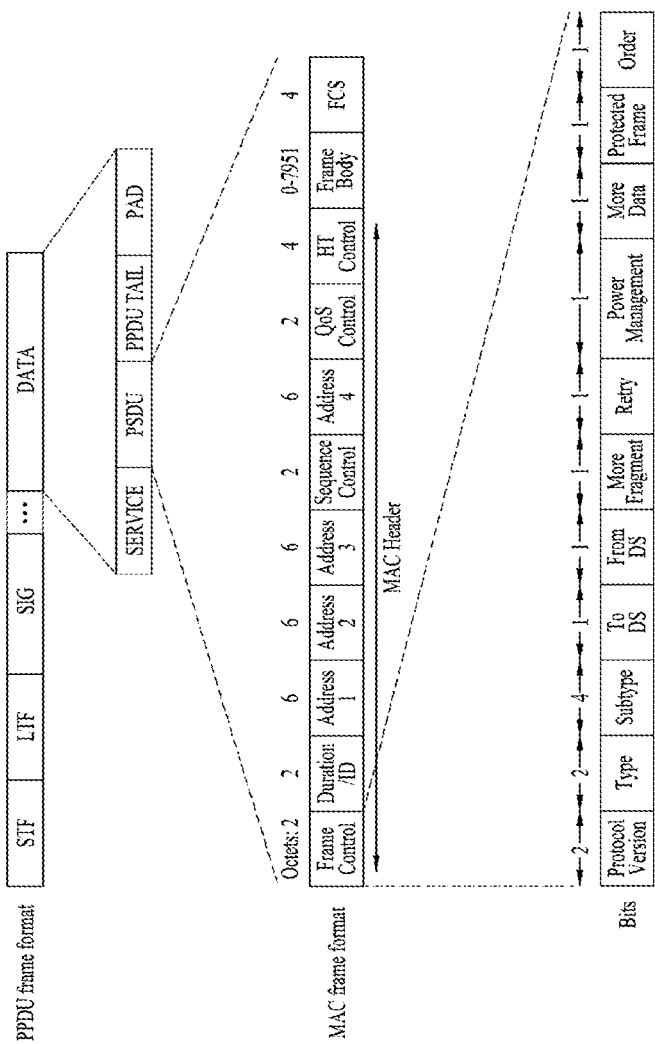
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an NIPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The NIPDU is defined depending on various MAC frame formats, and a basic MAC frame includes a MAC header, a frame body and an FCS (Frame Check Sequence). The MAC frame may be composed of the NIPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and subtype, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

WUR(Wake-Up Radio)

First, a general description of a Wake-Up Radio Receiver (WURx), which is compatible with a WLAN system (e.g., 802.11), will now be given with reference to FIG. 11.

Figure 11:
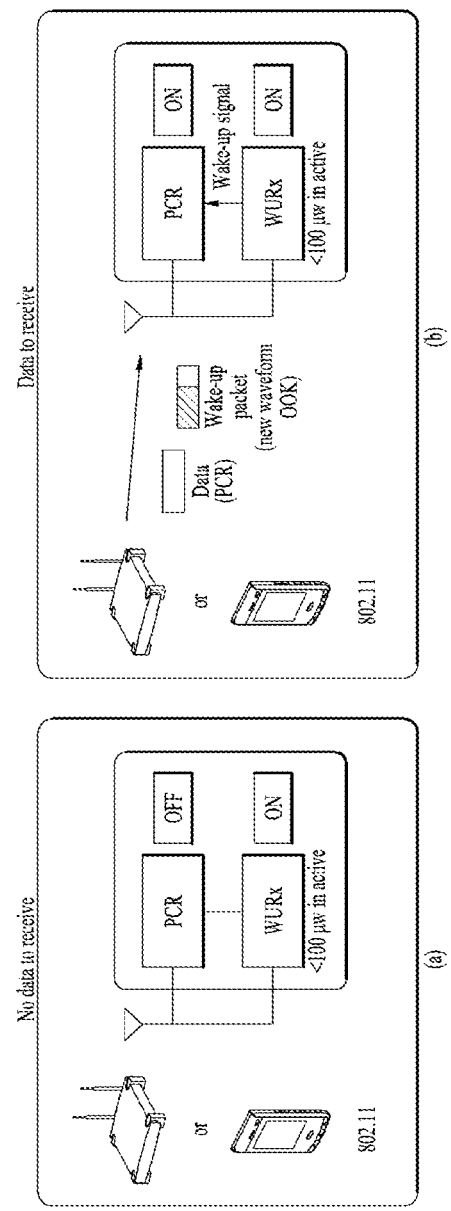
FIG. 11 is an explanatory diagram of a WUR receiver usable in a WLAN system (e.g., 802.11).

Referring to FIG. 11, an STA may support a Primary Connectivity Radio (PCR) (e.g., IEEE 802.11a/b/g/n/ac/ax WLAN), which is used for main wireless communication, and a Wake-Up Radio (WUR) (e.g., IEEE 802.11ba).

The PCR is used for data transmission and reception and may be turned off when there is no data to be transmitted and received. In the case in which the PCR is turned off, if there is a packet to be received, a WURx of the STA may wake the PCR. Therefore, user data is transmitted through the PCR.

The WURx may not be used for user data and may function only to wake a PCR transceiver. The WURx may be a simple type of receiver without a transmitter and is activated while the PCR is turned off. In an active state, target power consumption of the WURx desirably does not exceed 100 microwatts (μW). To operate at such low power, a simple modulation scheme, for example, On-Off Keying (OOK), may be used and a narrow bandwidth (e.g., 4 MHz or 5 MHz) may be used. A reception range (e.g., distance) aimed by the WURx may conform to current 802.11.

Figure 12:
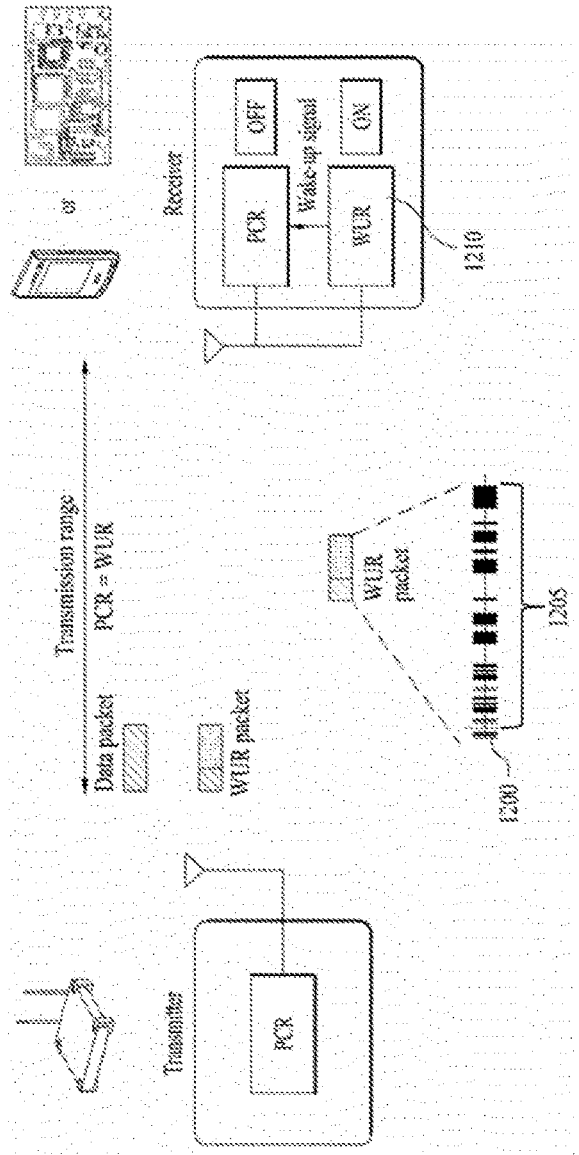
FIG. 12 is an explanatory diagram of operation of a WUR receiver.

FIG. 12 is an explanatory diagram of design and operation of a WUR packet.

Referring to FIG. 12, the WUR packet may include a PCR part 1200 and a WUR part 1205.

The PCR part 1200 is used for coexistence with a legacy WLAN system and the PCR part may be referred to as a WLAN preamble. To protect the WUR packet from other PCR STAs, at least one of an L-STF, an L-LTF, or an L-SIG of a legacy WLAN may be included in the PCR part 1200. Therefore, a third party legacy STA may be aware, through the PCR part 1200 of the WUR packet, that the WUR packet is not intended therefor and a medium of a PCR has been occupied by another STA. However, the WURx does not decode the PCR part of the WUR packet. This is because the WURx supporting narrowband and OOK demodulation does not support reception of a PCR signal.

At least a portion of the WUR part 1205 may be modulated using on-off keying (OOK). For example, the WUR part may include at least one of a WUR preamble, a MAC header (e.g., a receiver address, etc.), a frame body, or a Frame Check Sequence (FCS). OOK modulation may be performed by correcting an OFDM transmitter.

On the other hand, the WUR synchronization field of the WUR part may be referred to as a preamble. For example, it may be referred to as a WUR preamble by summing the preamble of the WUR part and the 20 MHz non-HT preamble of the PCR prompt. The preamble of the WUR part may include a WUR synchronization sequence. The length of the WUR SYNC sequence may vary depending on a data rate applied to a WUR data field. Thus, the data rate may be indicated by the WUR synchronization sequence. In case of a low data rate (e.g., 62.6 kbps), the WUR synchronization sequence may be set to 128 μs. And, in case of a high data rate (e.g., 250 kbps), the WUR synchronization sequence may be set to 64 μs. A sync sequence of 64 μs corresponds to a 32-bit binary sequence S, where 1 bit corresponds to 2 μs. The sync sequence of 128 μs corresponds to the combination of the binary sequence S and a complementary sequence S* of the binary sequence S.

A WURx 1210 may consume very low power less than 100 μW, as described above, and may be implemented by a small, simple OOK demodulator.

Thus, since the WUR packet needs to be designed to be compatible with the WLAN system, the WUR packet may include a preamble (e.g., an OFDM scheme) of a legacy WLAN and a new Low-Power (LP)-WUR signal waveform (e.g., an OOK scheme).

Figure 13:
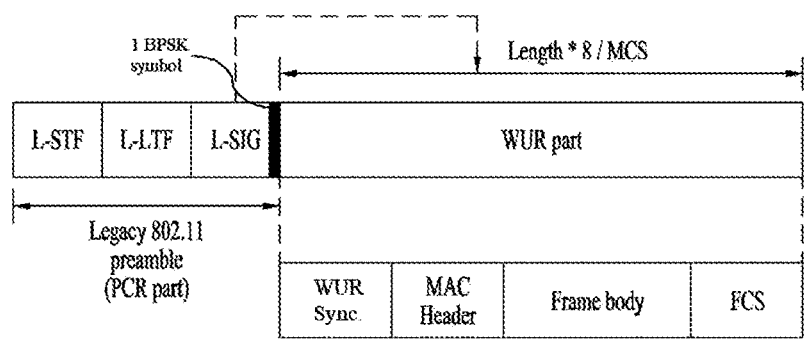
FIG. 13 illustrates an example of a WUR packet.

FIG. 13 illustrates an example of a WUR packet. The WUR packet of FIG. 13 includes a PCR part (e.g., a legacy WLAN preamble) for coexistence with a legacy STA.

Referring to FIG. 13, the legacy WLAN preamble may include an L-STF, an L-LTF, and an L-SIG. A WLAN STA (e.g., a third party) may detect the beginning of the WUR packet through the L-STF. The WLAN STA (e.g., the third party) may detect the end of the WUR packet through the L-SIG. For example, the L-SIG field may indicate the length of a (e.g., OOK-modulated) payload of the WUR packet.

A WUR part may include at least one of a WUR preamble, a MAC header, a frame body, or an FCS. The WUR preamble may include, for example, a PN sequence. The MAC header may include a receiver address. The frame body may include other information necessary for wake-up. The FCS may include a Cyclic Redundancy Check (CRC).

Figure 14:
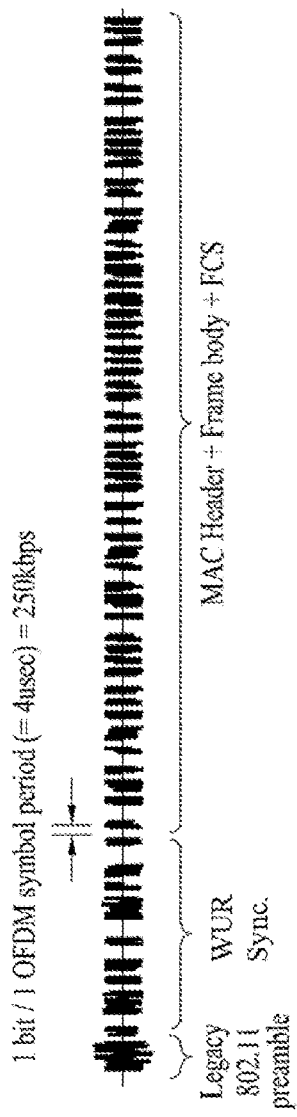
FIG. 14 illustrates the waveform of a WUR packet.

FIG. 14 illustrates the waveform of the WUR packet of FIG. 13. Referring to FIG. 14, in an OOK-modulated WUR part, one bit per OFDM symbol period (e.g., 4 μsec) may be transmitted. Therefore, a data rate of the WUR part may be 250 kbps.

Figure 15:
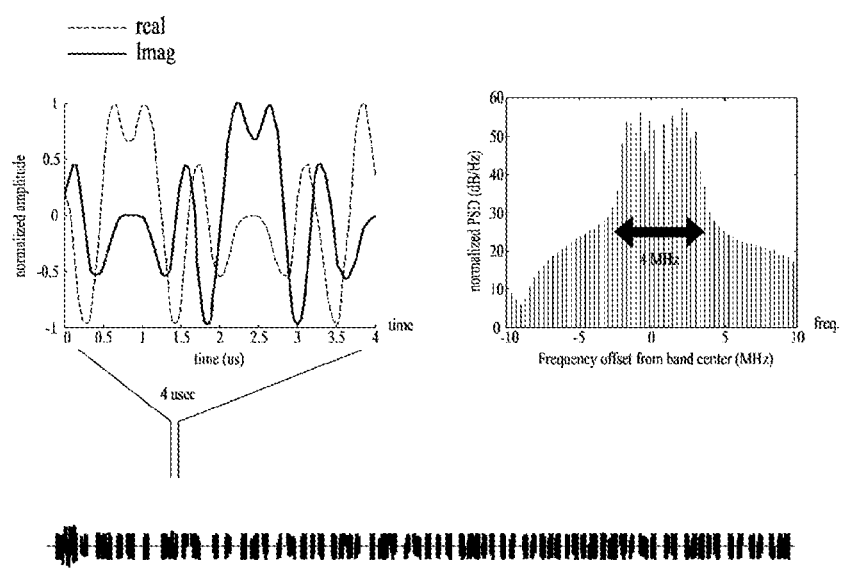
FIG. 15 is an explanatory diagram of a WUR packet generated using an OFDM transmitter of a WLAN.

FIG. 15 is an explanatory diagram of a WUR packet generated using an OFDM transmitter of a WLAN. In the WLAN, a Phase Shift Keying (PSK)-OFDM transmission scheme is used. If the WUR packet is generated by adding a separate OOK modulator for OOK modulation, implementation cost of a transmitter may increase. Therefore, a method of generating the OOK-modulated WUR packet by reusing an OFDM transmitter is considered.

According to an OOK modulation scheme, a bit value of 1 is modulated to a symbol having power of a threshold value or more (i.e., on) and a bit value of 0 is modulated to a symbol having power lower than the threshold value (i.e., off). Obviously, the bit value of 1 may be defined as power 'off'.

Thus, in the OOK modulation scheme, the bit value of I/O is indicated through power-on/off at a corresponding symbol position. The above-described simple OOK modulation/ demodulation scheme is advantageous in that power consumed to detect/demodulate a signal of a receiver and cost for receiver implementation may be reduced. OOK modulation for turning a signal of/off may be performed by reusing a legacy OFDM transmitter.

The left graph of FIG. 15 illustrates a real part and an imaginary part of a normalized amplitude during one symbol period (e.g., 4 μsec) for an OOK-modulated bit value 1 by reusing an OFDM transmitter of a legacy WLAN. Since an OOK-modulated result for a bit value 0 corresponds to power-off, this is not illustrated.

The right graph of FIG. 15 illustrates normalized Power Spectral Density (PSD) for an OOK-modulated bit value 1 on the frequency domain by reusing the OFDM transmitter of the legacy WLAN. For example, a center 4 MHz may be used for WUR in a corresponding band. In FIG. 15, although WUR operates in a bandwidth of 4 MHz, this is for convenience of description and frequency bandwidths of other sizes may be used. In this case, it is desirable that WUR operate in a narrower bandwidth than an operating bandwidth of a PCR (e.g., the legacy WLAN) in order to reduce power.

In FIG. 15, it is assumed that a subcarrier width (e.g., subcarrier spacing) is 312.5 kHz and an OOK pulse bandwidth corresponds to 13 subcarriers. The 13 subcarriers correspond to about 4 MHz (i.e., 4.06 MHz=13*312.5 kHz) as described above.

In the legacy OFDM transmitter, an input sequence of Inverse Fast Fourier Transform (IFFT) is defined as s={13 subcarrier tone sequence} and IFFT for the sequence s is performed as Xt=IFFT(s) and then a Cyclic Prefix (CP) of a length of 0.8 μsec is added, thereby generating a symbol period of about 4 μs.

The WUR packet may also be referred to as a WUR signal, a WUR frame, or a WUR PPDU. The WUR packet may be a packet for broadcast/multicast (e.g., a WUR beacon) or a packet for unicast (e.g., a packet for ending and then waking up a WUR mode of a specific WUR STA).

Figure 16:
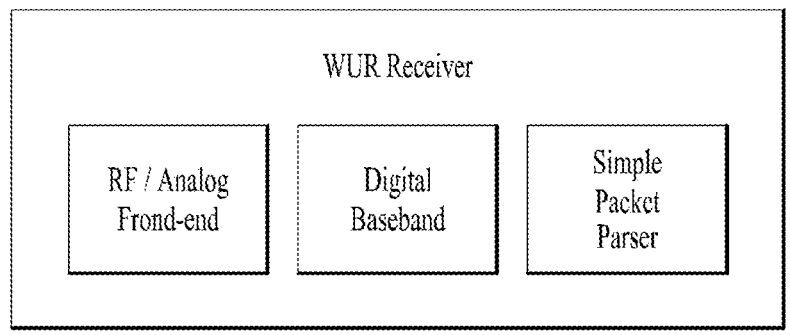
FIG. 16 illustrates the structure of a WUR receiver.

FIG. 16 illustrates the structure of a WURx. Referring to FIG. 16, the WURx may include an RF/analog front-end, a digital baseband processor, and a simple packet parser. FIG. 16 illustrates an exemplary structure of the WURx and the WURx of the present disclosure is not limited to the configuration of FIG. 16.

Hereinbelow, a WLAN STA having the WURx is simply referred to as a WUR STA. The WUR STA may be simply referred to as an STA.

Manchester coding based OOK modulation may be used for the WUR data field. The WUR data field may support multiple data rates (e.g., 62.5 kbps, 250 kbps). When Manchester coding is applied, a bit value of 0 is represented as '2 μs On-symbol+2 μs Off-symbol', and a bit value of 1 is represented as '2 μs Off-symbol+2 μs On-symbol'. When Manchester coding is applied, a bit value of 0 is represented as '4 μs On-symbol+4 μs Off-symbol+4 μs On-symbol+4 μs Off-symbol', and a bit value of 1 is represented as '4 μs Off-symbol+4 μs On-symbol+4 μs Off-symbol+4 μs On-symbol'.

WUR mode signaling may be defined in order for the WUR STA to enter the WUR mode. For example, WUR mode signaling may be performed via PCR if explicit WUR mode signaling is used, and WUR operating parameters may be provided via the WUR mode signaling. If the STA is in the WUR mode, the STA's WURx may follow the duty cycle schedule (WURx always on included) negotiated with the AP. If the STA STA is in the WUR mode, an existing negotiated service period between the AP and the STA may be extended for the STA's PCR schedule TWT. If the service period is extended, the STA does not have to wake up during the service period, and the parameters of the negotiated service period are stored in the AP and the STA. If the STA is in the WUR mode and the STA's PCR is in PS mode, the STA may not receive a PCR beacon frame.

A WUR action frame for WUR negotiation may be defined, and the WUR action frame includes a WUR IDentifier (WID) and may be transmitted via PCR. The WID QI uniquely identifies the WUR STA in the BSS of the AP. The WID included in a unicast wake-up frame identifies a recipient WUR STA.

The AP may use EDCA for WUR frame transmission. For example, the AP may re-use the existing 4-Access Category (AC) and corresponding EDCA parameters so as to transmit a WUR signal. The WUR signal may be, for example, but not limited to, a unicast wake-up packet, a multicast wake-up packet, a broadcast wake-up packet, or a WUR beacon. The AP may use any AC for transmission of the WUR beacon or the multicast wake-up packet. If the AP is not the case of having a buffered frame for the STA, the AP may use any AC for the unicast wake-up packet. After having sent the WUR signal using an EDCAF of a specific AC, the AP should not update the reattempt count of CW and AC. If a failure of the unicast wake-up packet sent using the EDCACF of the specific AC is confirmed, the AP should not update the reattempt count of the CW HN and the AC.

The AP sends the unicast wake-up packet and then waits for a timeout interval. If the AP receives any transmission of the STA for the timeout interval, the AP may consider that the transmission of the wake-up packet is successful. Otherwise, the AP retransmits the wake-up packet if the wake-up packet transmission fails. Meanwhile, after receiving the unicast wake-up packet, the STA transmits a response frame to the AP through the PCR.

A multi-user wake-up frame may be transmitted in a multicast/broadcast manner to wake up a plurality of WUR mode STAs. The AP may transmit a Broadcast Wake-Up Frame and then send a broadcast/multicast frame via the PCR over a provisioning period.

A WUR beacon frame may be transmitted periodically, and a beacon interval may be indicated in a WUR mode element. The WUR mode element may be transmitted via PCR. An address field of the WUR beacon frame includes a Transmitter's IDentifier (TxID). A TD control field of the WUR beacon frame may include a partial Timing Synchronization Function (TSF) for synchronization.

After transmitting a wake-up packet to STAs, the AP may transmit an 11ax trigger frame requesting a response frame from the corresponding STAs.

Figure 17:
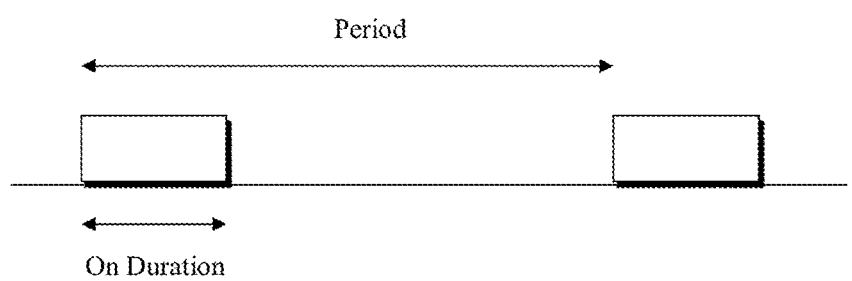
FIG. 17 illustrates a WUR duty cycle mode.

FIG. 17 is a diagram to describe a WUR duty cycle mode. A WUR receiver of an STA may operate in a duty cycle mode. A period of the WUR duty cycle may be a multiple of a basic unit, and the basic unit may be indicated by an AP. An on-duration in a period of each WUR duty cycle is set to be equal to or greater than a minimum wake-up duration. The minimum wake-up duration may be indicated by the AP. The AP QI may determine a starting point of the WUR duty cycle.

Figure 18:
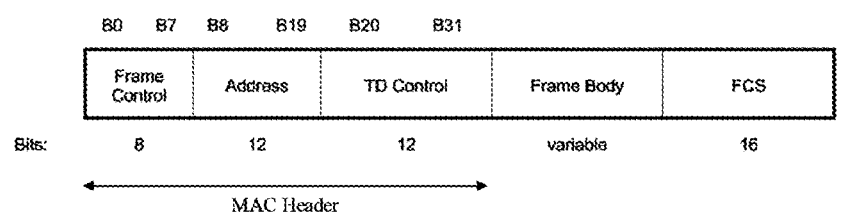
FIG. 18 illustrates a general WUR frame structure.

A structure of a general WUR frame (e.g., a MAC frame or a WUR data field of WUR PPDU) will be described with reference to FIG. 18.

A length of a MAC header is fixed to 32 bits.

A frame control field of a MAC header includes a type subfield representing a frame type (e.g., WUR Beacon: 0, Wake-up Frame: 1, Vendor specific frame: 2, etc.), a Length/Misc. subfield and reserved bits. The type subfield identifies whether a WUR frame is a Constant Length (CL) WUR frame or a Variable Length (VL) subframe together with the Length/Misc. subfield. In the VL WUR frame, the Length/Misc. subfield includes length information. In the VL WUR frame, the Length/Misc. subfield does not include length information and the corresponding bits may be used for other usages.

An address field of the MAC header is set to (i) WID for Unicast Wake-Up frame, (ii) Group ID (GID) for Multicast Wake-Up frame, (iii) TxID for WUR Beacon or Broadcast Wake-Up frame, and (iv) OUT1 for Vendor Specific frame. The WID is provided by an AP to an STA and identifies the 1 WUR STA. The GID is provided by the AP to the STA and identifies one or more STAs. The TxID is determined by the AP as a sender identifier. The OUT1 corresponds to the 12 MSBs of OUI.

A Type Dependent (TD) control field of the MAC header includes Type Dependent control information.

The frame body may be optionally provided in a WUR subframe. For example, an STA may or may not support a non-zero-length frame body. When the frame body is included in the WUR subframe, the length of a frame body field may be indicated as a predetermined octet unit (e.g., maximum 8 or 16 octets) in a length subfield of the frame control field.

A Frame Check Sequence (FCS) includes a CRC of the WUR subframe. The FCS may correspond to a portion of BSSID information.

On the other hand, the AP may indicate a BSS parameter update (e.g., PCR system information) or Group Addressed BU by increasing a counter included in the Wake-Up frame.

Authentication for WUR Frame

A method for an AP to transmit an authenticated/protected WUR frame to STAs will be described.

If an AP sends a WUR frame, an STA checks whether the WUR frame is the WUR frame sent to the STA itself. If the WUR frame sent to the STA is confirmed, the STA turns on a PCR (e.g., WLAN) and may then receive a PCR frame from the AP or transmit a PCR frame to the AP.

If an attacker attempts to wake up the STA by transmitting an attack frame such as a reply attack or the like, it may cause a problem that the STA performs a wake-up to unnecessarily consume power. In order to solve this problem, an authentication/protection method for a WUR frame is newly proposed.

Figure 19:
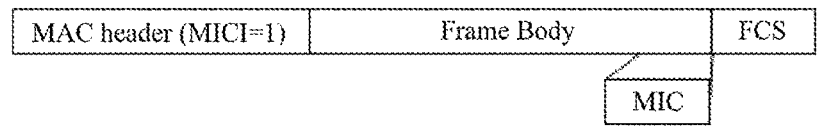
FIG. 19 illustrates a WUR frame according to one embodiment of the present disclosure.

FIG. 19 illustrates a WUR frame according to one embodiment of the present disclosure.

An AP may send a WUR frame in which a Message Integrity Code (MIC) is contained. The MIC may be referred to as another name. Although FIG. 19 shows an example of sending MIC information contained in a frame body, the present disclosure is not limited thereto. And, the MIC may be contained in other parts besides the frame body, for example, a MAC header, an FCS, etc.

Referring to FIG. 19, MIC Indication MICI), which is information indicating whether an MIC is included in a frame body, may be included in a MAC header. For example, 'MICI=1' indicates that the MIC is included in the WUR frame, and 'MICI=0' may indicate that the MIC is not included in the WUR frame.

An STA checks the MIC information included in the WUR frame. If the MIC information included in the WUR frame matches an MIC value (e.g., a value for MIC verification) included in the WUR frame and calculated by the STA, the STA may process the received WUR frame as an authenticated frame. Otherwise, the STA may discard the received WUR frame.

Figure 20:
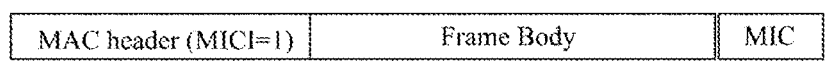
FIG. 20 illustrates a WUR frame according to another embodiment of the present disclosure.

FIG. 20 illustrates a WUR frame according to another embodiment of the present disclosure.

Referring to FIG. 20, MIC may be included in FCS instead of being included in Frame Body.

For another example, the MIC may be attached after the FCS.

Hereinafter, for convenience, it will be assumed that MIC is included in Frame Body.

An exemplary method of calculating MIC is briefly described below. An MIC value calculated by an STA receiving a WUR frame may be used for purposes of verifying MIC information included in the WUR subframe, and thus the MIC value that the STA calculates may be referred to as an MIC verifier.

When calculating MIC, an AP/STA may use a Timing Synchronization Function (TSF) instead of a value of a Packet Parameter Number (PN) or a CCMP (CTR with CBC-MAC protocol) header. The TSF may be the value used after being updated using Partial TSF (e.g., Timestamp) included in the received frame. The AP may send the Partial TSF value included in a WUR frame (e.g., MAC header or Frame Body of the frame).

The STA may update a Full TSF value with the received Partial TSF value and use the updated Full TSF to compute the MIC.

Figure 21:
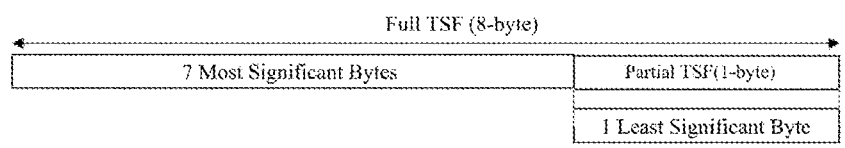
FIG. 21 illustrates various examples of Partial TSF values.
Figure 21:
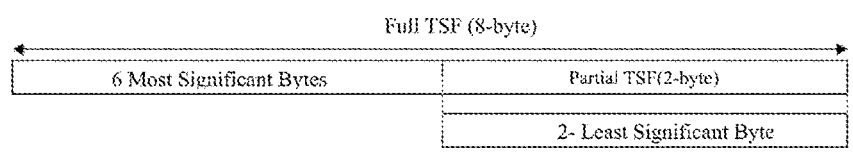
Figure 21:
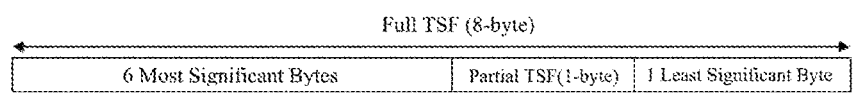

FIG. 21 illustrates various examples of Partial TSF values.

Hereinafter, for convenience of description, Partial TSF or MIC input value will be expressed in unit of bytes (i.e., 8-bit). For example, N Least Significant Bytes may mean the least significant 8N bits, and M Most Significant Bytes may mean the most significant 8M bits.

The Partial TSF value included in the WUR frame may be 1 Least Significant Byte of Full TSF (e.g., Option 1 of FIG. 21 (a)) or 2 Least Significant Bytes of Full TSF (e.g., Option 2 of FIG. 21 (b)).

The STA updates the Full TSF based on Partial TSF received according to Option 1 or 2, and may use the updated Full TSF as an input value for calculating the MIC.

On the other hand, unlike the option ½ described in (a)/(b) of FIG. 21, according to option 3, the partial TSF value included in the WUR frame may be configured with M most significant bytes among N least significant bytes of the Full TSF (where each of N and M is greater than 0 and smaller than 8, and N>M.). FIG. 21 (c) shows an example (e.g., option 3) of N=2 and M=1 (i.e., 1 most significant byte in 2 least significant bytes).

The STA may update the Full TSF using the received Partial TSF, and then use the updated 8 bytes Full TSF as an input value to compute the MIC.

In FIG. 21 (c), N=2 and M=1 are assumed, but this is for convenience of description, and N and M of the present disclosure may be changed into different values.

Figure 22:
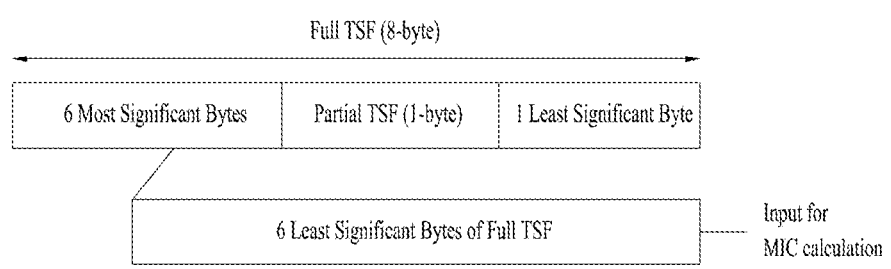
FIG. 22 shows an example of an input value for a MIC verification calculation.

Alternatively, the STA may use N least significant bytes (2<N<8, N is an integer) in the updated 8 bytes Full TSF only as an input value to calculate the MIC. FIG. 22 shows an input value for MIC calculation when N is 6.

In the example where N least significant bytes of the FULL TSF are used as an MIC input value, the above-mentioned option 1 or 2 may be applicable in order for the STA to use the Partial TSF to update the FULL TSF. For example, the STA may update the full TSF using 1 least significant byte or 2 least significant bytes, and then use the N least significant bytes (e.g., 6 bytes) as an input value for calculating the MIC.

On the other hand, assuming that Partial TSF is given based on the option 3 (e.g., most significant bytes among 2 least significant bytes of Full TSF), it may happen that the STA has a least significant byte that is different from the least significant byte of the Full TSF possessed by the AP because a WUR STA fails to receive 1 least significant byte. As such, since the STA has a wrong TSF and calculates the MIC, it may happen that the STA recognizes its frame as a wrong frame.

As a method for solving such a problem, when the STA updates the most significant byte of the 2 least significant bytes of the Full TSF with Partial TSF, the STA may use the N consecutive bytes in the rest of bytes excluding the least significant byte of the Full TSF as an input value to calculate MIC. In this case, a TSF portion that the STA updates using the partial TSF should be included in the MIC input value.

Figure 23:
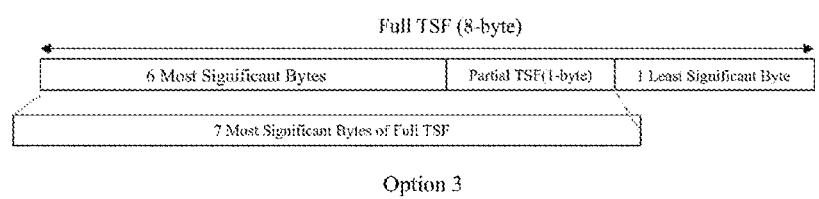
FIG. 23 shows another example of an input value for a MIC verification calculation.

FIG. 23 is a diagram to describe an example of an MIC input value. Assume N=7 in FIG. 23. In FIG. 23, the remaining 7 most significant bytes except 1 least significant byte of Full TSF may be used as an MIC input value.

Figure 24:
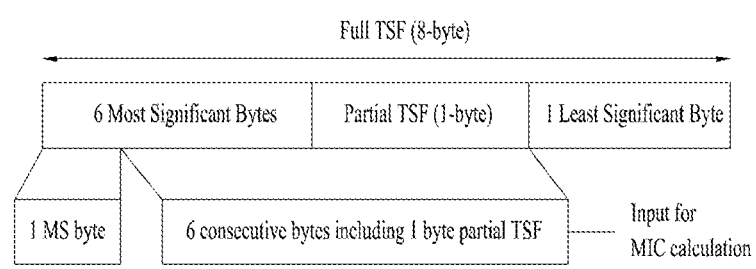
FIG. 24 illustrates another example of an input value for a MIC verification calculation.

FIG. 24 is a diagram to describe another example of an MIC input value. Assume N=6 in FIG. 24. An input value for calculating MIC in FIG. 24 may be 6 consecutive bytes including a partial TSF of 1 byte.

Alternatively, an STA may use APID of K byte(s) or Partial BSSID (PBSSID) in combination with a TSF value instead of using the 1 least significant byte of Full TSF. For example, let K=1 or 2 and assume a PBSSID of 1 byte.

1-byte PSSID may be attached to the front, middle, or rear of the TSF.

Figure 25:
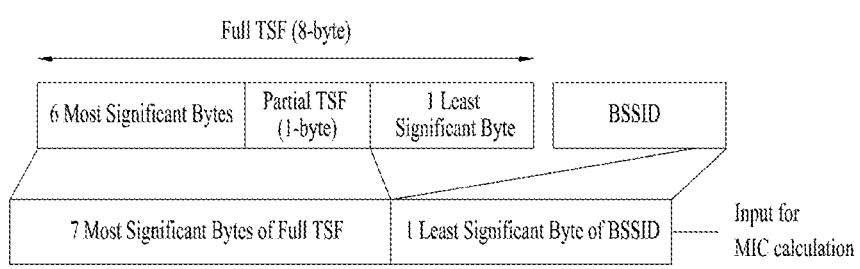
FIG. 25 illustrates another example of an input value for a MIC verification calculation.

FIG. 25 is a diagram to describe an MIC input value according to an embodiment of the present disclosure. In FIG. 25, it is assumed that 1-byte PBSSID is attached to a rear of TSF.

Referring to FIG. 25, an input value for calculating MIC is total 8 bytes and consists of '7 most significant bytes of Full TSF+1 least significant byte of BSSID'.

Figure 26:
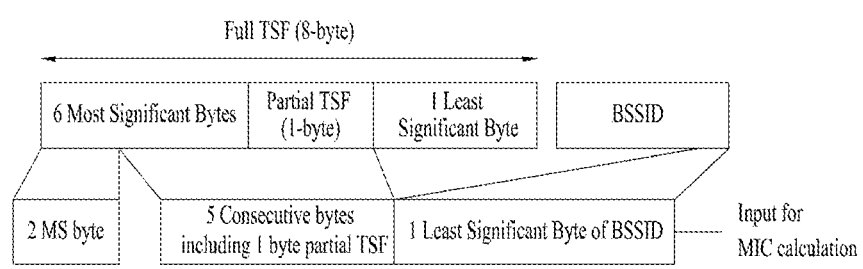
FIG. 26 illustrates another example of an input value for a MIC verification calculation.

FIG. 26 is a diagram to describe an MIC input value according to another embodiment of the present disclosure.

Referring to FIG. 26, an input value for calculating MIC is total 6 bytes, and consists of '5 consecutive bytes including 1 byte partial TSF+1 least significant byte of BSSID'. Here, a partial TSF value used as the input value may mean the rest of Full TSF except 1 least significant byte and 2 most significant bytes.

The N, M, and K values mentioned above are exemplary description and may be replaced with other values. Also, the values of N, M, and K are not necessarily limited to byte units, and may be expressed as various bit units such as 1-bit, 2-bit, 3-bit, 4-bit, 5-bit, 6-bit, 7-bit, 8-bit, 9-bit, etc.

Figure 27:
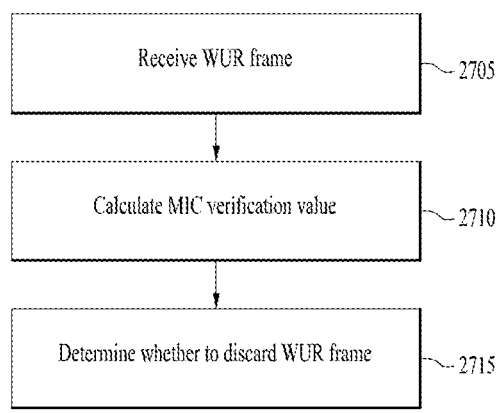
FIG. 27 illustrates a flow of a method for transmitting and receiving a WUR frame according to an embodiment of the present disclosure.

FIG. 27 illustrates a flow of a method for transmitting and receiving a WUR frame according to an embodiment of the present disclosure.

Referring to FIG. 27, an STA receives a WUR frame including a first portion of a Timing Synchronization Function (TSF) timer and a Message Integrity Check (MIC) value [2705] The first portion of the TSF timer included in the WUR frame may be 8-bit next to the least significant N-bit in the TSF timer. The MIC value may be included in a Frame Check Sequence (FCS) of the WUR subframe. N may be a positive integer of 8, 9 . . . .

The STA may determine that the MIC value is included in the WUR subframe only when a prescribed indicator in a MAC header of the WUR subframe is a first value.

The STA computes an MIC verification value based on the first portion of the TSF timer and the TSF timer stored in the STA [2710]. The STA may obtain a consecutive 48-bit (i.e., 6-byte) partial TSF timer value through the first portion of the TSF timer and a second portion of the TSF timer stored in the STA, and calculate an MIC verification value based on the obtained 48-bit partial TSF timer value. The TSF timer is total 64-bits (i.e., 8-bytes), and the most significant M-bit of the TSF timer may be excluded from the partial TSF timer. M may be a positive integer of 8, 7 . . . etc. The STA may set the first portion of the TSF timer to the least significant 8 bit of the consecutive 48-bit partial TSF timer value, and set the second portion of the TSF timer stored in the STA to the remaining 40 bits of the consecutive 48-bit partial TSF timer value, thereby obtaining a consecutive 48-bit partial TSF timer value.

The STA may determine whether to discard the received WUR frame based on whether the MIC value included in the WUR frame matches the calculated MIC verification value [2715]. If the MIC value included in the WUR frame does not match the MIC verification value calculated by the STA, the STA may discard the WUR frame. If the MIC value included in the WUR frame matches the MIC verification value calculated by the STA, the STA may perform a wake-up operation based on the WUR frame.

On the other hand, the STA may receive a WUR beacon frame prior to receiving the WUR frame and set a TSF timer to be stored in the STA based on TSF timer information included in the WUR beacon frame. The TSF timer information may be included in a Type Dependent (TD) control field of the WUR beacon frame.

Figure 28:
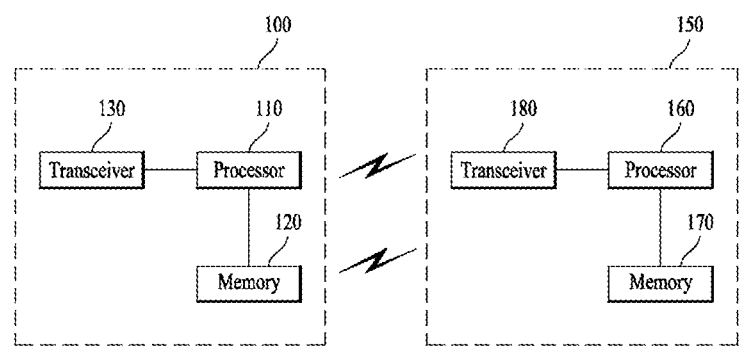
FIG. 28 is a diagram to describe an apparatus according to an embodiment of the present disclosure.

FIG. 28 is an explanatory diagram of an apparatus for implementing the above-described method.

A wireless apparatus 100 of FIG. 30 may correspond to the above-described specific STA and a wireless apparatus 850 of FIG. 30 may correspond to the above-described AP.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-mentioned UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The transceiver 130 of the STA may include a transmitter (not shown) and a receiver (not shown). The receiver of the STA may include a primary connectivity receiver for receiving a PCR (e.g., WLAN such as IEEE 802.11 a/b/g/n/ac/ax) signal and a WUR receiver for receiving a WUR signal. The transmitter of the STA may include a PCR transmitter for transmitting a PCR signal.

The transceiver 180 of the AP may include a transmitter (not shown) and a receiver (not shown). The transmitter of the AP may correspond to an OFDM transmitter. The AP may transmit a WUR payload by an OOK scheme by reusing an OFDM transmitter. For example, the AP may modulate the WUR payload by an OOK scheme through an OFDM transmitter as described above.

The detailed description of the exemplary embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein.

INDUSTRIAL APPLICABILITY

The present disclosure may be applied to various wireless communication systems including an IEEE 802.11 system.

What is claimed is:

1. A method of receiving a Wake-Up Radio (WUR) frame by a Station (STA) in a Wireless LAN (WLAN), the method comprising:
receiving the WUR frame including a first portion of a Timing Synchronization Function (TSF) timer and a Message Integrity Check (MIC) value;
calculating a MIC verification value based on the first portion of the TSF timer and the TSF timer stored in the STA; and
determining whether to discard the received WUR frame based on whether the MIC value included in the WUR frame matches the calculated MIC verification value,
wherein the first portion of the TSF timer included in the WUR subframe is 8 bits next to least significant N bits in the TSF timer and
wherein the STA obtains a consecutive 48-bit partial TSF timer value through the first portion of the TSF timer and a second portion of the TSF timer stored in the STA and calculates the MIC verification value based on the obtained 48-bit partial TSF timer value.

2. The method of claim 1, wherein the TSF timer is total 64 bits and wherein most significant M-bit of the TSF timer is excluded from the partial TSF timer.

3. The method of claim 1, wherein the STA obtains the consecutive 48-bit partial TSF timer value by setting the first portion of the TSF timer to least significant 8 bits of the consecutive 48-bit partial TSF timer value and setting the second portion of the TSF timer stored in the STA to the remaining 40 bits of the consecutive 48-bit partial TSF timer value, thereby obtaining the successive 48-bit partial TSF metric timer value.

4. The method of claim 1, wherein the MIC value is included in a Frame Check Sequence (FCS) of the WUR subframe.

5. The method of claim 4, wherein if the MIC value included in the WUR frame does not match the MIC verification value calculated by the STA, the STA discards the WUR frame and wherein if the MIC value included in the WUR frame matches the MIC verification value calculated by the STA, the STA performs a wake-up operation based on the WUR frame.

6. The method of claim 5, further comprising:
receiving a WUR beacon frame prior to receiving the WUR frame; and
setting the TSF timer to be stored in the STA based on TSF timer information included in the WUR beacon frame.

7. The method of claim 6, wherein the TSF timer information is included in a Type Dependent (TD) control field of the WUR beacon frame.

8. The method of claim 1, wherein the STA determines that the MIC value is included in the WUR subframe only if a prescribed indicator in a MAC header of the WUR subframe is a first value.

9. A Station (STA) receiving a Wake-Up Radio (WUR) frame, the STA comprising:
a receiver receiving the WUR frame including a first portion of a Timing Synchronization Function (TSF) timer and a Message Integrity Check (MIC) value; and
a processor configured to calculate a MIC verification value based on the first portion of the TSF timer and the TSF timer stored in the STA and determine whether to discard the received WUR frame based on whether the MIC value included in the WUR frame matches the calculated MIC verification value,
wherein the first portion of the TSF timer included in the WUR subframe is 8 bits next to least significant N bits in the TSF timer and
wherein the processor obtains a consecutive 48-bit partial TSF timer value through the first portion of the TSF timer and a second portion of the TSF timer stored in the STA and calculates the MIC verification value based on the obtained 48-bit partial TSF timer value.

10. The STA of claim 9, wherein the TSF timer is total 64 bits and wherein most significant M-bit of the TSF timer is excluded from the partial TSF timer.

11. The STA of claim 9, wherein the processor obtains the consecutive 48-bit partial TSF timer value by setting the first portion of the TSF timer to least significant 8 bits of the consecutive 48-bit partial TSF timer value and setting the second portion of the TSF timer stored in the STA to the remaining 40 bits of the consecutive 48-bit partial TSF timer value, thereby obtaining the successive 48-bit partial TSF metric timer value.

12. The STA of claim 9, wherein the MIC value is included in a Frame Check Sequence (FCS) of the WUR subframe.

13. The STA of claim 12, wherein if the MIC value included in the WUR frame does not match the MIC verification value calculated by the processor, the processor discards the WUR frame and wherein if the MIC value included in the WUR frame matches the MIC verification value calculated by the processor, the processor performs a wake-up operation based on the WUR frame.

14. The STA of claim 13, wherein the receiver receives a WUR beacon frame prior to receiving the WUR frame and wherein the processor sets the TSF timer to be stored in the STA based on TSF timer information included in the WUR beacon frame.

15. The STA of claim 9, wherein the processor determines that the MIC value is included in the WUR subframe only if a prescribed indicator in a MAC header of the WUR subframe is a first value.

* * * * *